(12) United States Patent
Chang

(10) Patent No.: US 11,755,077 B2
(45) Date of Patent: Sep. 12, 2023

(54) BUCKLE RING DEVICE FOR MEMORY SLOT

(71) Applicant: INNODISK CORPORATION, New Taipei (TW)

(72) Inventor: Shuang-Te Chang, New Taipei (TW)

(73) Assignee: Innodisk Corporation, New Taipei (TW)

( * ) Notice: Subject to any disclaimer, the term of this patent is extended or adjusted under 35 U.S.C. 154(b) by 371 days.

(21) Appl. No.: 17/169,891

(22) Filed: Feb. 8, 2021

(65) Prior Publication Data

US 2022/0129049 A1 Apr. 28, 2022

(30) Foreign Application Priority Data

Oct. 28, 2020 (TW) ................................ 109137427

(51) Int. Cl.
*G06F 1/18* (2006.01)
*H01R 12/72* (2011.01)
*H01R 12/88* (2011.01)

(52) U.S. Cl.
CPC ........... *G06F 1/185* (2013.01); *H01R 12/721* (2013.01); *H01R 12/88* (2013.01)

(58) Field of Classification Search
CPC ......... G06F 1/185; G06F 1/18; H01R 12/721; H01R 12/88; H01R 12/72; H01R 12/7023; H01R 12/7029; H01R 12/737; H01R 43/26; H01R 2201/06; F16B 2/22; G11C 29/56016; G11C 5/04

USPC ........... 361/679.32, 679.33, 679.34, 679.35, 361/679.36, 679.37, 679.38

See application file for complete search history.

(56) References Cited

U.S. PATENT DOCUMENTS

| | | | |
|---|---|---|---|
| 2003/0030991 A1* | 2/2003 | Riddiford | G06F 21/31 |
| | | | 361/679.58 |
| 2018/0130505 A1* | 5/2018 | Querbach | G11C 5/063 |
| 2019/0165503 A1* | 5/2019 | Geng | H01R 12/737 |
| 2021/0203090 A1* | 7/2021 | Gooi | F16B 2/22 |

FOREIGN PATENT DOCUMENTS

| | | |
|---|---|---|
| CN | 201278387 Y | 7/2009 |
| TW | M352168 U | 3/2009 |

* cited by examiner

*Primary Examiner* — Timothy J Thompson
*Assistant Examiner* — Guillermo J Egoavil
(74) *Attorney, Agent, or Firm* — Rosenberg, Klein & Lee

(57) ABSTRACT

The invention discloses a buckle ring device for a memory slot. A memory module is able to be inserted into the memory slot. The memory slot is provided at two sides thereof with a seat, respectively. A clamp structure is pivotally connected to an inside of the seat. Two sides of the memory module inserted in the memory slot are clamped by the clamp structures. When the buckle ring device is assembled on the seat of the memory slot, the seat and the clamp structures can be used for constraining the displacement of the buckle ring device in XYZ axis directions, resulting in strengthening the clamping of the clamp structures to the memory module by the buckle ring device.

6 Claims, 8 Drawing Sheets

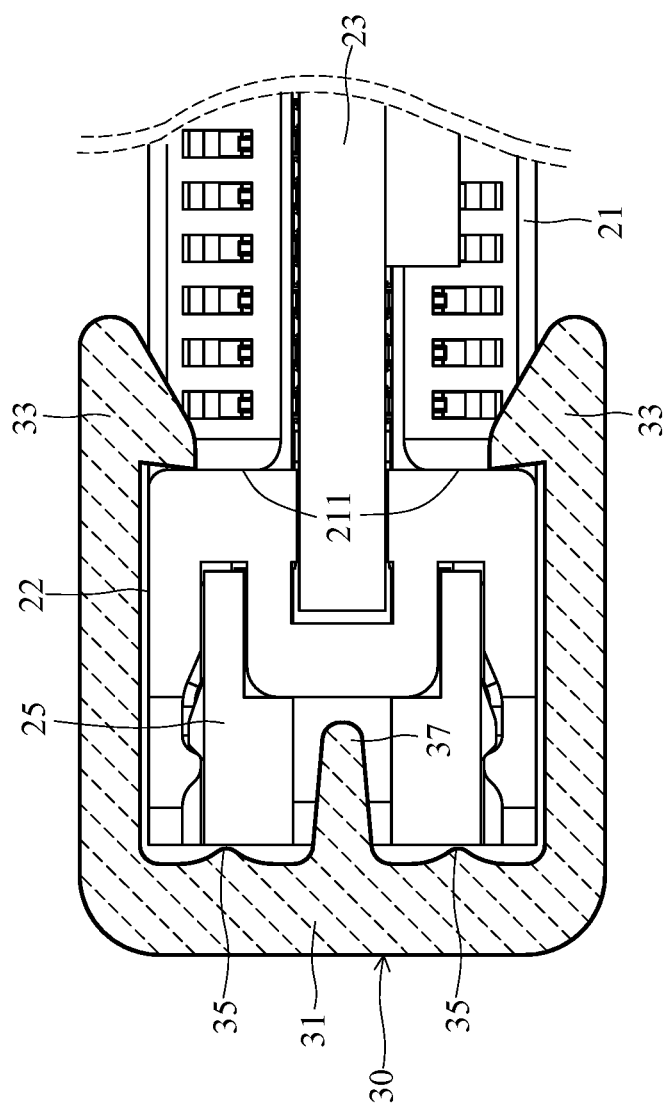
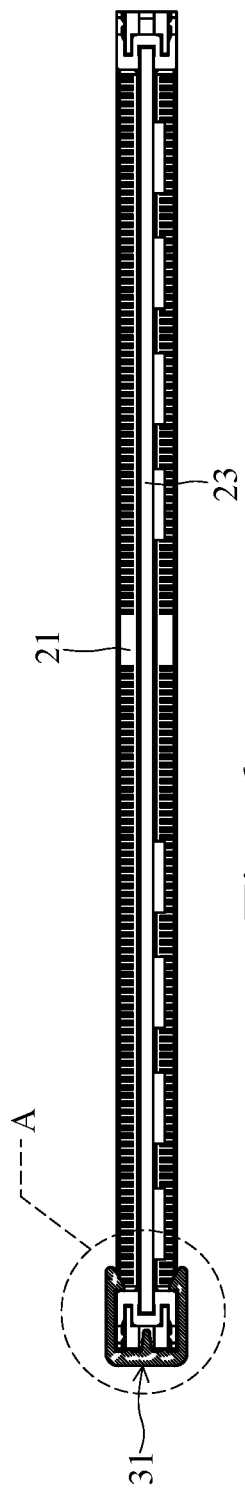

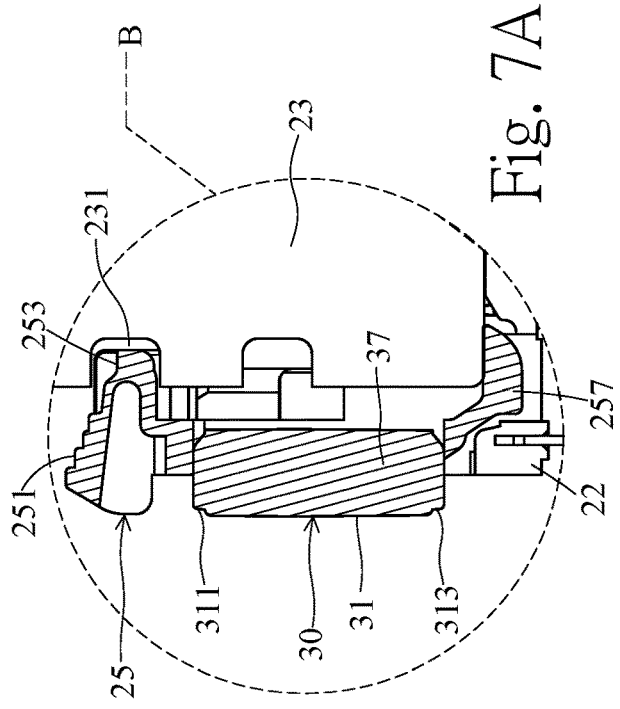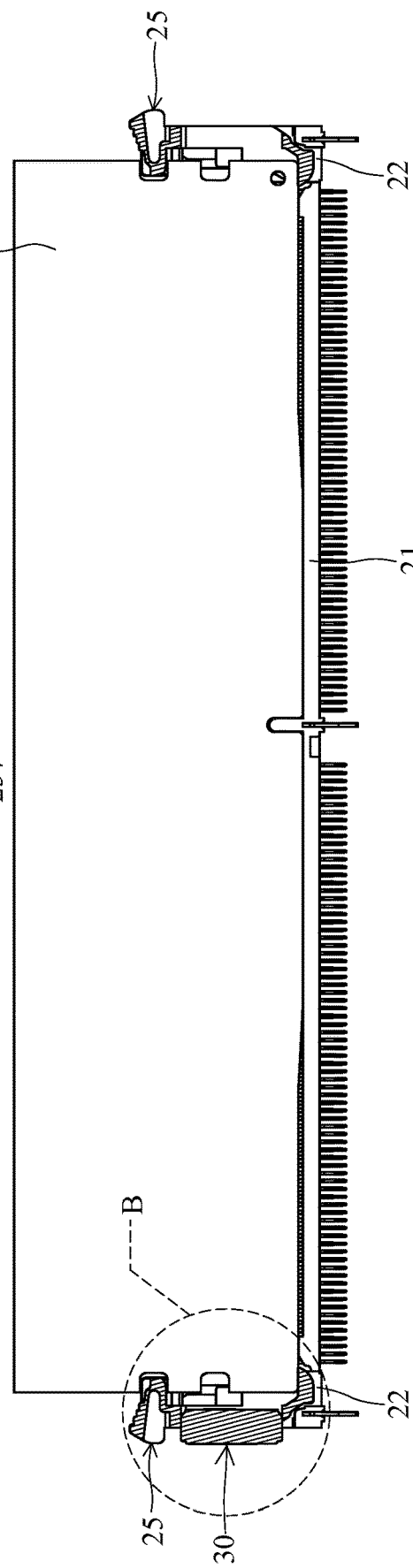

BUCKLE RING DEVICE FOR MEMORY SLOT

This non-provisional application claims priority claim under 35 U.S.C. § 119(a) on Taiwan Patent Application No. 109137427 filed Oct. 28, 2020, the entire contents of which are incorporated herein by reference.

FIELD OF THE INVENTION

The present invention relates to a buckle ring device, more particularly, to a device capable of strengthening the clamping of the clamp structures of the memory slot to the memory module.

BACKGROUND

FIG. 1 is a stereogram of a memory module inserted into a memory slot in prior art. In general, a motherboard of a computer is provided with at least one memory slot 11 thereon. A memory module 13 is inserted to the memory slot 11. The memory slot 11 is provided at two sides thereof with a clamp structure 15, respectively. The clamp structures 15 fix the memory module 13 in the memory slot 11 in an embedded way. For example, embedded blocks of the clamp structures 15 are embedded into side notches of the memory module.

By the disposition of the clamp structures 15, the memory module 13 can be preliminary fixed in the memory slot. However, the clamp structures 15 easily shake on the memory slot 11 in the process of moving the computer due to vibration factors, resulting in the memory module 13 to loosen from the memory slot 11, which will affect an electrically connection between the memory slot 11 and the memory module 13, and further affecting the operation of the computer system.

SUMMARY

It is one objective of the present invention to provide a buckle ring device for a memory slot, in which a memory module can be inserted into the memory slot. Two sides of the memory slot are provided with a pair of seats. Each of clamp structures is pivotally connected to an inside of the corresponding seat. Two sides of the memory module inserted in the memory slot are clamped by the clamp structures. When the clamp structures clamps the memory module, the buckle ring devices are able to be assembled on the seats, so as to stabilize the clamp structures in the seats, and avoid that the clamp structures in the seat loosens due to an external force, and affect a connection between the memory module and the memory slot.

It is another objective of the present invention to provide the buckle ring device for the memory slot, wherein when the buckle ring device is assembled on the seat of the memory slot, the seat and the clamp structure are used for constraining the displacement of the buckle ring device in XYZ axis directions. Accordingly, the buckle ring device can be used strengthening the clamping of the clamp structures to the memory module in the memory slot, in such a way that a connection between the memory module and the memory slot can be improved to avoid that the memory module is loosened from the memory slot.

To achieve the above objective, the present invention provides a buckle ring device for a memory slot, wherein a memory module is inserted into the memory slot, the memory slot is provided at two sides thereof with a seat, respectively; a clamp structure is pivotally connected to an inside of the seat; two sides of the memory module are clamped by the clamp structures; wherein, the buckle ring device comprises a main body and a pair of hook portions located at two sides of the main body, the main body and the pair of hook portions are combined into a U-shaped component; when the buckle ring device is assembled on the seat, the pair of hook portions will be buckled on a connection surface between the memory slot and the seat.

In one embodiment of the present invention, the main body of the buckle ring device is provided at an inner surface thereof with a pair of raised portions corresponding to the pair of hook portions.

In one embodiment of the present invention, the clamp structure comprises a push block, an embedded block, a protruding hook, and a fixed arm; the fixed arm is pivotally connected to the inside of the seat, provided at a top end thereof with the push block and the embedded block, and provided at a bottom end thereof with the protruding hook; the fixed arm is further provided with a slotted hole thereon, and the main body of the buckle ring device is further provided at the inner surface thereof with a insertion pin; when the buckle ring device is assembled on the seat, the insertion pin will be inserted into the slotted hole.

In one embodiment of the present invention, the insertion pin is configured between the pair of raised portions.

In one embodiment of the present invention, the clamp structure comprises a push block, an embedded block, a protruding hook, and a fixed arm; the fixed arm is pivotally connected to the inside of the seat, provided at a top end thereof with the push block and the embedded block, and provided at a bottom end thereof with the protruding hook; the main body of the buckle ring device is provided at a top end thereof with a positioning block; when the buckle ring device is assembled on the seat, the positioning block will lean against a bottom edge of the push block of the clamp structure.

In one embodiment of the present invention, the clamp structure comprises a push block, an embedded block, a protruding hook, and a fixed arm; the fixed arm is pivotally connected to the inside of the seat, provided at a top end thereof with the push block and the embedded block, and provided at a bottom end thereof with the protruding hook; wherein, the main body of the buckle ring device is provided at a bottom end thereof with a positioning block; when the buckle ring device is assembled on the seat, the positioning block will lean against an upper edge of the protruding hook of the clamp structure.

In one embodiment of the present invention, the clamp structure comprises a push block, an embedded block, and a fixed arm; the fixed arm is pivotally connected to the inside of the seat, and provided at a top end thereof with the push block and the embedded block; wherein, the main body of the buckle ring device is provided at a bottom end thereof with a positioning block; when the buckle ring device is assembled on the seat, the positioning block will be configured on the bottom end of the fixed arm and used for filling a gap between the fixed arm and the seat.

In one embodiment of the present invention, the buckle ring device is an elastic element.

In one embodiment of the present invention, the memory module is a DRAM module or a SDRAM module.

BRIEF DESCRIPTION OF THE DRAWINGS

FIG. 6 is a top sectional view of the buckle ring device assembled on the memory slot.

FIG. 6A is an enlarged view of A area in FIG. 6.

FIG. 7 is a side sectional view of the buckle ring device assembled on the memory slot.

FIG. 7A is an enlarged view of B area in FIG. 7.

DETAILED DESCRIPTION OF THE PREFERRED EMBODIMENTS

Figure 1:
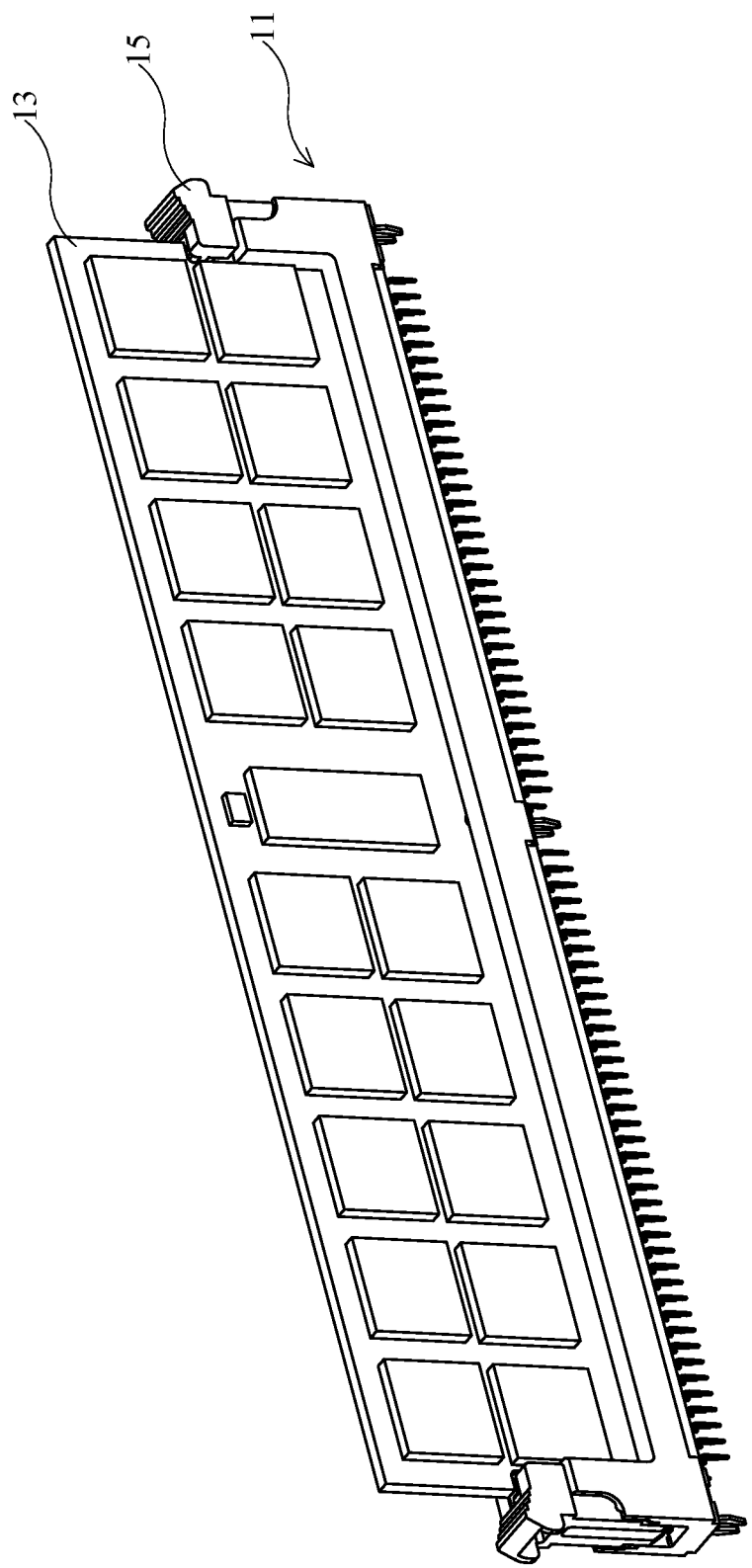
FIG. 1 is a stereogram of a memory module inserted into a memory slot in prior art.
Figure 2:
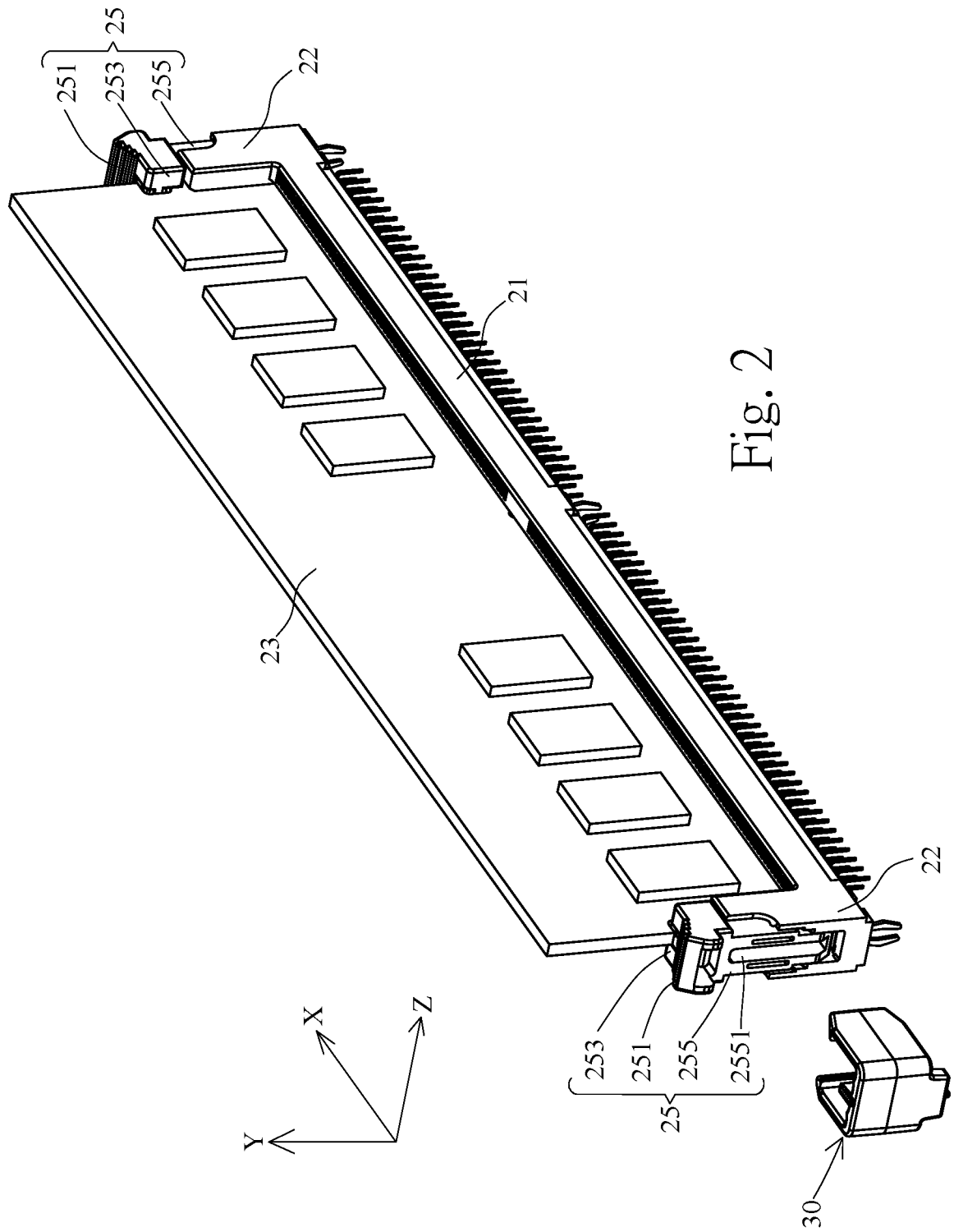
FIG. 2 is a stereogram of a buckle ring device separated from a memory slot.
Figure 3:
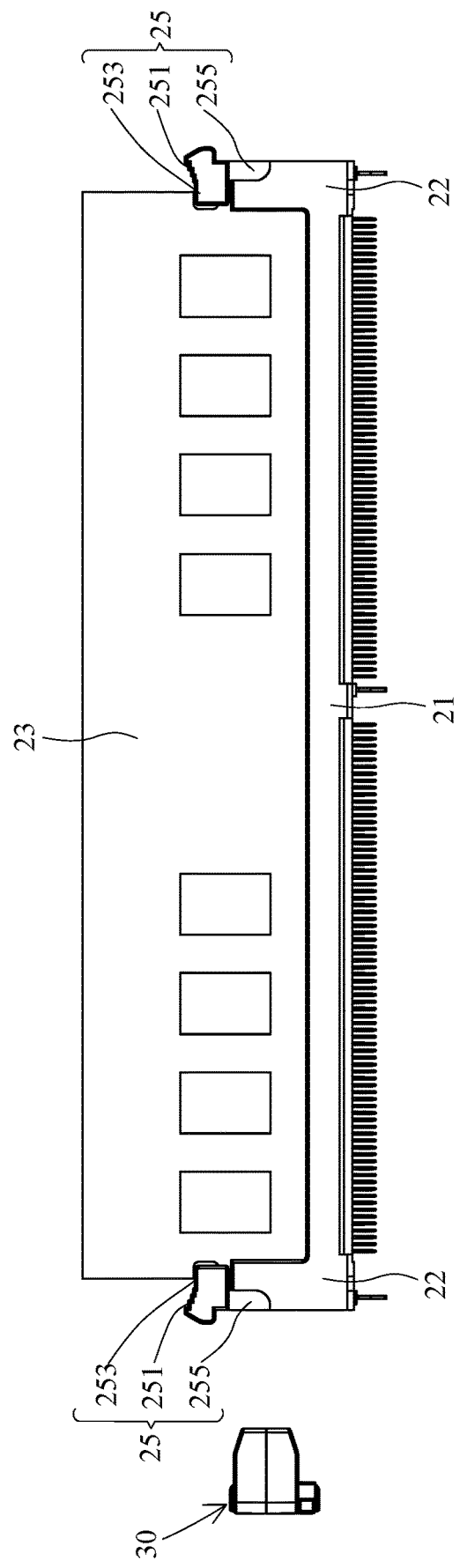
FIG. 3 is a side view of the buckle ring device separated from the memory slot.
Figure 4:
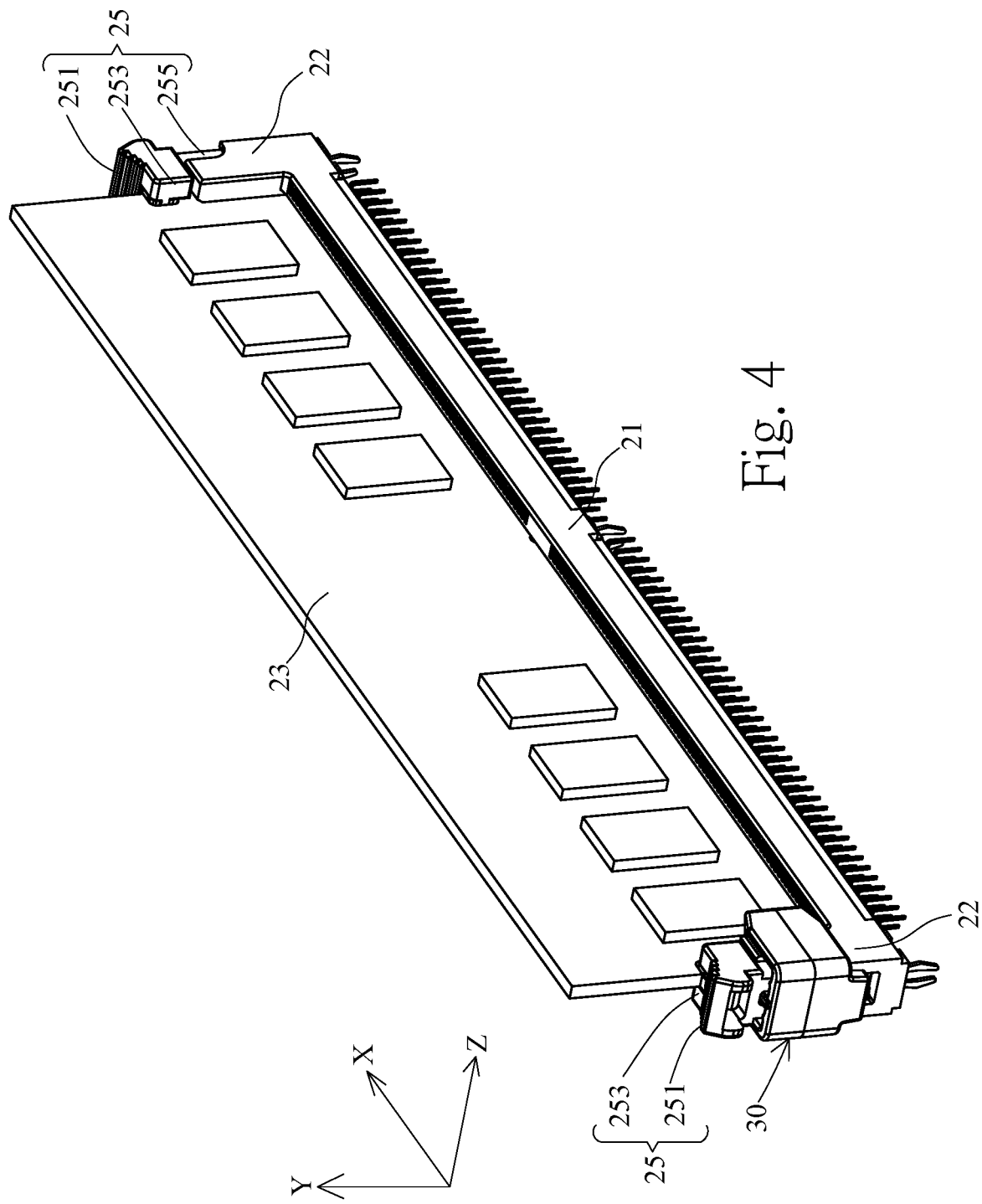
FIG. 4 is a stereogram of the buckle ring assembled on the memory slot.
Figure 5:
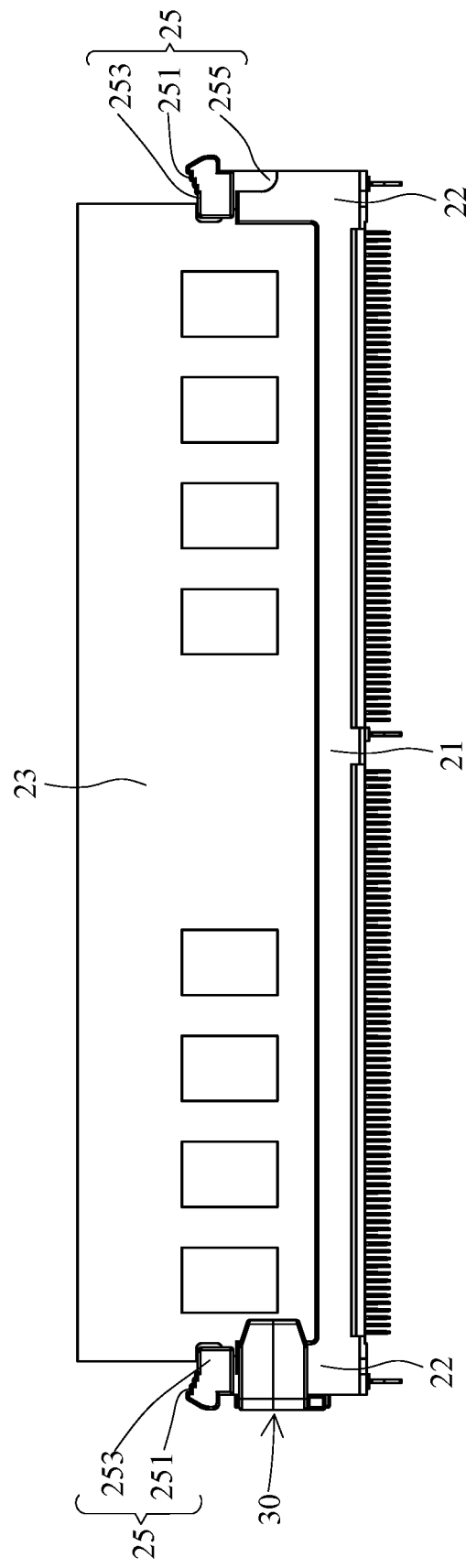
FIG. 5 is a side view of the buckle ring device assembled on the memory slot.
Figure 8C:
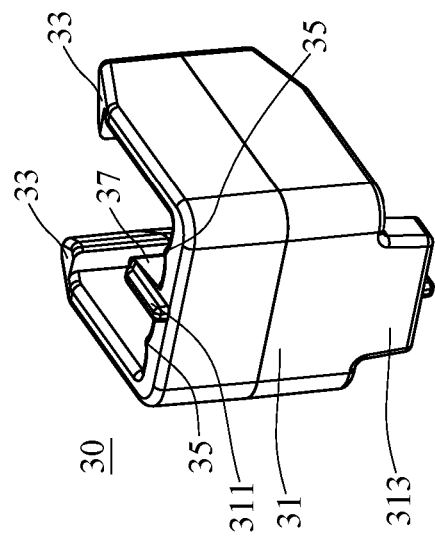
FIG. 8C is a stereogram of the buckle ring device at a first viewing angle.
Figure 8D:
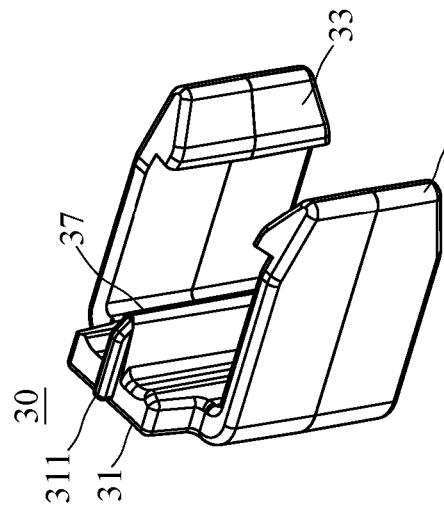
FIG. 8D is a stereogram of the buckle ring device at a second viewing angle.
Figure 8A:
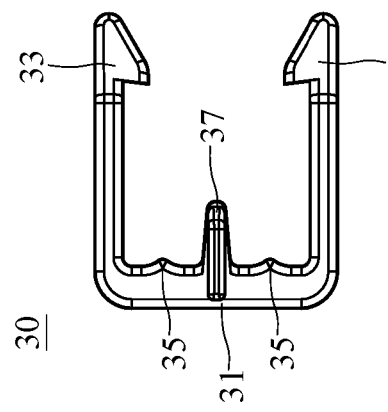
FIG. 8A is a top view of the buckle ring device.
Figure 8B:
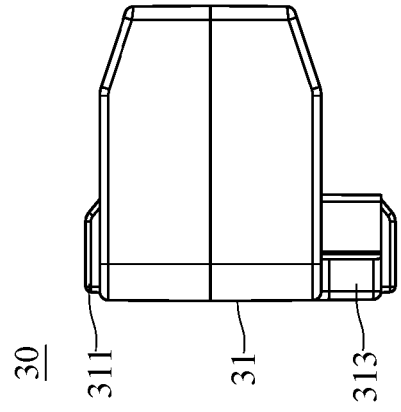
FIG. 8B is a side view of the buckle ring device.

FIG. 2, FIG. 3, FIG. 4, FIG. 5, FIG. 6, FIG. 6A, FIG. 7, FIG. 7A, FIG. 8A, FIG. 8B, FIG. 8C, and FIG. 8D, there are shown a stereogram of a buckle ring device separated from a memory slot, a side view of the buckle ring device separated from the memory slot, a stereogram of the buckle ring assembled on the memory slot, a side view of the buckle ring device assembled on the memory slot, a side view of the buckle ring device assembled on the memory slot, an enlarged view of A area in FIG. 6, a side sectional view of the buckle ring device assembled on the memory slot, an enlarged view of B area in FIG. 7, a top view of the buckle ring device, a side view of the buckle ring device, a stereogram of the buckle ring device at a first viewing angle, and a stereogram of the buckle ring device at a second viewing angle. As shown in these figures, the memory slot 21 is a slot conforming to DRAM or SDRAM standard specification, and is provided on a motherboard of a compute. A memory module 23 conforming to DRAM or SDRAM standard specification is able to be inserted into the memory slot 21. The computer can dynamically and randomly access a data generated by the memory module 23 during a computer system in operating.

The memory slot 21 is provided at two sides thereof with a seat 22, respectively. The seat 22 is a hollow seat. A clamp structure 25 is pivotally connected to the inside of the seat 22. The clamp structure 25 comprises a push block 251, an embedded block 253, a fixed arm 255, and a protruding hook 257 (as shown in FIG. 7A). The fixed arm 255 is pivotally connected to the inside of the seat 22, provided at a top end thereof with the push block 251 and the embedded block 253, and provided at a bottom end thereof with the protruding hook 257. The fixed arm 255 can swing upward or downward beside a side opening of the seat 22. When the memory module 23 is inserted into the memory slot 21, the fixed arm 255 will swing upward, the embedded block 253 at the top end of the fixed arm 255 will lean against the memory module 23, and be embedded into a side notch 231 (as shown in FIG. 7A) of the memory module 23 to fix the memory module 23 inside the memory slot 21. When the memory module 23 wants to be pull out from the memory slot 21, user can push the push blocks 251 toward the outside of the memory slot 21 by fingers; then, the fixed arm 255 will swing downward, the embedded block 253 at the top end of the fixed arm 255 will be separated from the side notch 231 of the memory module 23, the protruding hook 257 at the bottom end of the fixed arm 255 will swing upward to jack up the memory module 23 from the bottom of the memory module 23 and push the memory module 23 out from the memory slot 21, so that the memory module 23 can be taken out of the memory slot 21.

Besides, for improving the stability of the memory module 23 in the memory slot 21, each of the seats 22 located at the two sides of the memory slot 21 can be sleeved with a buckle ring device 30. The clamping forces of the clamp structures 25 in the seats 22 to the memory module 23 can be strengthened by the buckle ring devices 30.

The buckle ring device 30 is an elastic component, and comprises a main body 31 and a pair of hook portions 33 located at the two sides of the main body 31. The main body 31 and the hook portions 33 are combined into a U-shaped component. When the buckle ring device 30 wants to be assembled on the seat 22, user can take a U-shaped opening of the buckle ring device 30 towards the side opening of the seat 22, and then push the hook portions 33 of the buckle ring device 30 to the memory slot 21 along two side plates of the seat 22 so that the hook portions 33 of the buckle ring device 30 can be buckled on a connection surface 211 between the memory slot 21 and the seat 22. When the buckle ring device 30 has assembled on the seat 22 by the hook portions 33, the main body 31 of the buckle ring device 30 will lean against the side opening of the seat 22, and thus constraint the fixed arm 255 inside the seat 22.

The main body 31 of the buckle ring device 30 is provided at an inner surface thereof with a pair of raised portions 35 corresponding to the hook portions 33. When the buckle ring device 30 is assembled on the seat 22, the raised portions 35 will pass the side opening of the seat 22 to tightly lean on the fixed arm 255 inside the seat 22. Through the hook portions 33 to be buckled on the connection surface 211 while the raised portions 35 to tightly lean on the fixed arm 255, the displacement of the buckle ring device 30 in X axis direction will be constrained. Furthermore, the fixed arm 255 of the clamp structure 25 is unable to swing upward or downward when the clamp structure 25 is constrained inside the seat 22 by the buckle ring device 30.

The fixed arm 255 of the clamp structure 25 is provided with a slotted hole 2551 thereon, and the main body 31 of the buckle ring device 30 is provided at the inner surface thereof with an insertion pin 37. In one embodiment of the present invention, the insertion pin 37 is protruded between the raised portions 35. When the buckle ring device 30 is assembled on the seat 22, the insertion pin 37 will be inserted into the slotted hole 2551. Accordingly, the insertion pin 37 of the buckle ring device 30 has inserted into the slotted hole 2551, the displacement of the buckle ring device 30 in Z axis direction will be constrained by the slotted hole 2551 with a narrow space.

The main body 31 of the buckle ring device 30 is provided at the top end thereof with a first positioning block 311. When the buckle ring device 30 is assembled on the seat 22, the first positioning block 311 will lean against the bottom edge of the push block 251 of the buckle ring device 30.

The main body 31 of the buckle ring device 30 is provided at the bottom end thereof with a second positioning block 313. In one embodiment of the present invention, when the buckle ring device 30 is assembled on the seat 22, the second positioning block 313 leans against a top edge of the protruding hook 257 of the clamp structure 25. In other embodiment of the present invention, the fixed arm 255 of the clamp structure 25 is not provided at the bottom end thereof with the protruding hook 257; when the buckle ring device 30 is assembled on the seat 22, the second positioning block 313 will be configured on the bottom end of the fixed arm 255 and used for filling a gap between the fixed arm 255 and the seat 22. Through the first positioning block 311 to lean against the bottom edge of the push block 251 of the buckle ring device 30, as well as the second positioning block 313 to be used for filling the gap between the fixed arm 255 and the seat 22, the displacement of the buckle ring device 30 in Y axis direction will be constrained.

Summing up, when the buckle ring device 30 is assembled on the seat 22 of the memory slot 21, the clamp structure 25 will be constrained inside the seat 22 by the buckle ring device 30, such that the fixed arm 255 of the clamp structure 25 is unable to swing upward or downward. Besides, the seat 223 and the clamp structure 25 are used for constraining the displacement of the buckle ring device 30 in XYZ axis directions so that the buckle ring device 30 can be arranged on the seat 22 of the memory slot 21 firmly. Accordingly, the buckle ring device 30 can be used strengthening the clamping of the clamp structures 25 to the memory module 23 in the memory slot 21, in such a way that a connection between the memory module 23 and the memory slot 21 can be improved to avoid that the memory module 23 is loosened from the memory slot 21.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A buckle ring device for a memory slot, wherein a memory module is inserted into the memory slot, the memory slot is provided at two sides thereof with a seat, respectively; a clamp structure is pivotally connected to an inside of the seat; two sides of the memory module are clamped by the clamp structures; wherein, the buckle ring device comprises a main body and a pair of hook portions located at two sides of the main body, the main body and the pair of hook portions are combined into a U-shaped component; when the buckle ring device is assembled on the seat, the pair of hook portions will be buckled on a connection surface between the memory slot and the seat;

wherein the main body of the buckle ring device is provided at an inner surface thereof with a pair of raised portions corresponding to the pair of hook portions;

wherein the clamp structure comprises a push block, an embedded block, a protruding hook, and a fixed arm; the fixed arm is pivotally connected to the inside of the seat, provided at a top end thereof with the push block and the embedded block, and provided at a bottom end thereof with the protruding hook; the fixed arm is further provided with a slotted hole thereon, and the main body of the buckle ring device is further provided at the inner surface thereof with a insertion pin; when the buckle ring device is assembled on the seat, the insertion pin will be inserted into the slotted hole.

2. The buckle ring device according to claim 1, wherein the insertion pin is configured between the pair of raised portions.

3. The buckle ring device according to claim 1, the main body of the buckle ring device is provided at a top end thereof with a positioning block; when the buckle ring device is assembled on the seat, the positioning block will lean against a bottom edge of the push block of the clamp structure.

4. The buckle ring device according to claim 1, wherein, the main body of the buckle ring device is provided at a bottom end thereof with a positioning block; when the buckle ring device is assembled on the seat, the positioning block will lean against an upper edge of the protruding hook of the clamp structure.

5. The buckle ring device according to claim 1, wherein the buckle ring device is an elastic element.

6. The buckle ring device according to claim 1, wherein the memory module is a DRAM module or a SDRAM module.

* * * * *